United States Patent [19]

Smith

[11] Patent Number: 4,784,456
[45] Date of Patent: Nov. 15, 1988

[54] FIBER OPTIC CONNECTOR

[75] Inventor: James G. Smith, Nokomis, Fla.

[73] Assignee: E. I. Du Pont de Nemours and Company, Wilmington, Del.

[21] Appl. No.: 46,558

[22] Filed: May 6, 1987

[51] Int. Cl.⁴ .............................................. G02B 6/38
[52] U.S. Cl. ............................ 350/96.21; 350/96.20
[58] Field of Search ................ 350/96.20, 96.21, 96.22

[56] References Cited

U.S. PATENT DOCUMENTS

| | | | |
|---|---|---|---|
| 3,919,037 | 11/1975 | Miller | 156/502 |
| 4,029,390 | 6/1977 | Chinnock et al. | 350/96 |
| 4,057,448 | 11/1977 | Miller | 350/96.21 X |
| 4,135,782 | 1/1979 | Beauhaire | 350/96 |
| 4,146,301 | 3/1979 | Cherin et al. | 350/96 |
| 4,158,477 | 6/1979 | Phillips et al. | 350/96 |
| 4,181,400 | 1/1980 | Malsot et al. | 350/96 |
| 4,201,444 | 5/1980 | McCartney et al. | 350/96 |
| 4,254,865 | 3/1981 | Pacey et al. | 206/316 |
| 4,276,113 | 6/1981 | Carlsen et al. | 350/96.21 X |
| 4,345,137 | 8/1982 | Mignien et al. | 350/96.21 X |
| 4,354,731 | 10/1982 | Mouissie | 350/96 |
| 4,370,022 | 1/1983 | Johnson | 350/96 |
| 4,473,272 | 9/1984 | Johnson | 350/96 |
| 4,506,946 | 3/1985 | Hodge | 350/96 |
| 4,562,632 | 1/1986 | Parchet et al. | 29/281 |
| 4,615,581 | 10/1986 | Morimoto | 350/96.21 |
| 4,629,284 | 12/1986 | Malavieille | 350/96.21 |

FOREIGN PATENT DOCUMENTS 2074748 7/1983 United Kingdom .
2136147 9/1984 United Kingdom .

*Primary Examiner*—John D. Lee
*Assistant Examiner*—Phan Heartney

[57] ABSTRACT

A fiber optical connector for splicing optical fibers end-to-end in axial alignment. The connector housing comprises a bottom section and three top sections, each hingedly attached to the bottom section. The bottom section has chambers with the V-shaped grooves for inserting and properly orienting the optical fibers end-to-end. The top end sections each contain lands or fingers which, when closed, urge the fibers into the correct position within the V-shaped grooves and lock them there by exerting pressure on the protective jackets surrounding the fibers. The center top section has a land or finger which closes directly onto the end optical fibers, forcing correct and precise alignment and locking them in this orientation. A tension or strain relief may be installed over the connector. The connector permits final inspection of the fiber orientation and application of an index matching fluid prior to closing the center segment.

10 Claims, 3 Drawing Sheets

FIBER OPTIC CONNECTOR

FIELD OF THE INVENTION

This invention relates generally to a fiber optic connector and more particularly to joining or splicing two or more optical fibers together.

BACKGROUND OF THE INVENTION

The use of optical fibers as light guides or wave guides is now common in such fields as communications, local area networks, data transmission and optoelectronics. The need for splicing two single fibers in end-to-end orientation is well recognized and much development has been done with fusion techniques and with mechanical devices to achieve precise axial alignment. The devices generally are expensive, require a highly skilled individual for correct application and usually grip only the optic fiber itself, resulting in a fragile assembly requiring delicate handling as well as additional protective packaging to prevent breaking the brittle fiber.

The available prior art devices often comprise many separate pieces, adding to the difficulty of assembly. Additionally, these pieces will vary dimensionally one to another, even under careful manufacturing practice, and these variations will contribute to lateral misalignment of the optic fibers being spliced. Lateral misalignment is the greatest single factor in optic signal loss in fiber splices. Further, existing mechanical splices typically do not permit inspection of the fiber to fiber orientation after the fibers are in their locked condition.

Many prior art devices employ V-shaped grooves to aid in aligning the fibers. One such device for mounting optical fibers is described in U.S. Pat. No. 4,562,632 which issued Jan. 7, 1986 to Parchet et al. This patent illustrates a base having a terminal positioning V-groove for placing a terminal in a reference position and a V-groove for positioning the optical fiber. Another device is shown in U.S. Pat. No. 4,181,400 which issued Jan. 1, 1980 to Malso et al. This patent described a two-part connector for joining the optical fibers wherein each part contains as cylindrical sleeve with a V-shaped longitudinal groove sloped in relation to the axis of the sleeve. Other prior art devices employed V-shaped grooves or the like are shown in U.S. Pat. No. 4,201,444 issued May 6, 1980 to McCartney et al., U.S. Pat. No. 4,354,731 issued Oct. 19, 1982 to B. Mouissie and assigned to the assignee of the present application, and U.K. Pat. No. 2,074,748B published July 27, 1983 and assigned to Socapex.

SUMMARY OF THE INVENTION

The present invention provides a number of features not found in other devices, including those described in the aforenoted patents. These features make the optical fiber connector of the present invention easier to use so that durable, high efficiency, low loss splices can be made faster by less skilled individuals. The present invention may be used for splicing multi-mode as well as single-mode optical fiber.

The optical fiber connector of the present invention comprises a single molded body having four segments or sections appropriately hinged, thus eliminating multiple part handling and preventing incorrect assembly. It has a means whereby the device may be temporarily firmly held by a separate fixture, thus freeing both hands for the assembly operations of guiding and placing the fiber with one hand while closing the locking portion of the device with the other.

The bottom section of the connector body contains chambers with V-shaped grooves which permit easy insertion of the jacketed portion of the optical fiber on each end, with a short length of fiber filament end exposed in preparation for splicing. The grooves are formed in three principal areas. The outer grooves are inclined at a small angle to the grooves in the central area. The purpose of this inclination is to bend the fiber slightly to encourage the short exposed filament to lie in the bottom of the groove in the central area.

The upper segments or sections of the connector have lands or fingers to close on the fiber buffer or exposed optical fiber to force it into the bottom of the groove and lock it there. The outer segments are each provided with crosswise fins to force a misaligned fiber into the bottom of the groove without damage and thus prevent trapping a fiber in the misaligned position beside the finger.

The optical fiber connector of the present invention permits handling of only one fiber at a time, locking each fiber in place by gripping both the fiber and its plastic jacket (buffer) and permitting examination of the orientation of the fibers one to another before finally locking the fiber ends into the axially aligned position. In addition to permitting inspection, a short length of each fiber, as well as the ends of the fibers and the joint between them, are accessible so that an index matching fluid or epoxy can readily be applied before closing the splice connector and locking the fibers in alignment. While providing these desirable features, the connector splicing device is a single piece, thus preventing incorrect assembly and makimg possible the manufacture of the device at low cost.

The connector of the present invention may be constructed to accept and splice more than one pair of optical fibers at a time. For example, by providing two or more parallel chambers with V-shaped grooves, two or more pair of fibers may be simultaneously spliced end to end.

A strain or tension relief may be installed over the connector or splice assembly to relieve the tension on the cable at each end. The strain relief comprises two sections. One section has grooves which receive flanged ferrules inserted over the prepared end of each optical fiber cable. The second strain relief section may be snapped together with the first to provide a quick and easy means of strain relief.

Finally, the connector body may conveniently be provided with a projection along its bottom adapted to be received and held in a fixture assembly. This permits the operator to have both hands free during the splicing operation.

DETAILED DESCRIPTION OF THE PREFERRED EMBODIMENT

Figure 1:
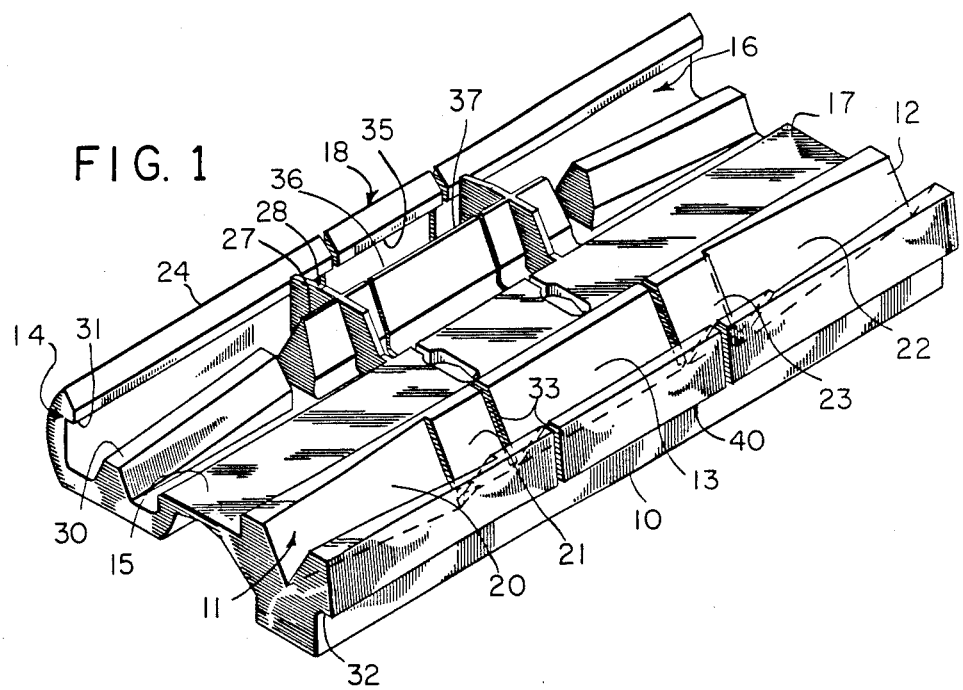
FIG. 1 is a perspective view of one embodiment of the present invention illustrating the fiber optic connector in the open position without optical fiber.

FIG. 1 illustrates a preferred embodiment of the present invention for joining or splicing of optical fibers using a connector or splice. The connector comprises a foldable, latchable holder having four main sections, each shown in the open position in FIG. 1. The connector body 10 includes two chambers 11 and 12 which receive optical fibers having plastic insulating jackets or buffers surrounding the optical fiber. A central chamber 13 receives and aligns the ends of both optical fibers which have been stripped of their insulating jackets or buffers. A first buffer lock 14 is connected to the body 10 by a flexible hinge 15 such that buffer lock 14 can be closed over chamber 11. A second buffer lock 16 is similarly joined to the body 10 by flexible hinge 17 and a fiber lock 18 is connected to the body 10 by a hinge 19. Buffer lock 16 can be closed over chamber 12 and fiber lock 18 can be closed over chamber 13. Buffer locks 14 and 16 and fiber lock 18 can be closed independent of one another.

Chamber 11 comprises a first V-shaped groove 20 which is sized to receive the jacketed optical fiber and a second V-shaped groove 21 sized to receive the optical fiber from which the plastic jacket has been removed. The first V-shaped groove 20 is inclined relative to the second V-shaped groove 21 so that the included angle between 20 and 21 is somewhat less than 180°. A suitable angle for the purpose of this invention has been found to be 173° though it should be clearly understood that the invention is not restricted to this angle.

Chamber 12 also comprises a first V-shaped groove 22 and a second V-shaped groove 23 which are oriented similarly to V-shpaed grooves 20 and 21, respectively, of chamber 11. Chamber 13 comprises a single V-shaped groove which is co-linear with V-shaped grooves 21 and 23 and is therefore inclined with respect to V-shaped grooves 20 and 22. The included angle between the planar side walls of V-shaped grooves 20, 21, 22, 23 and of chamber 13 is suitably 60°, although again not restricted to this angle.

Buffer locks 14 and 16 are similar, but for the purposes of this invention, are of opposite hand or mirror images of one another. Only buffer lock 14 will therefore be described fully.

Buffer lock 14 comprises an outer portion 24 and an inner portion 25. The inner portion 25 comprises a land section 26 which, when buffer lock 14 is closed, grips the fiber buffer; a land section 27 which, when closed, grips the optical fiber; and a cross vane 28, the purpose of which will be described below.

Figure 4:
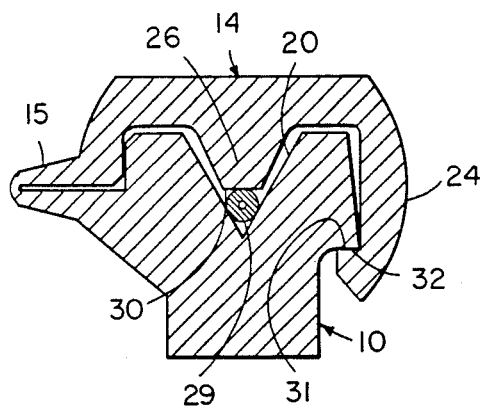
FIG. 4 is a sectional view taken along a line A—A of FIG. 3 illustrating the connector in the closed and latched position gripping the fiber buffer securely.

FIG. 4 is a cross section of the body 10 at buffer lock 14 in the land section 26 and V-shaped groove 20 with buffer lock 14 in the closed and latched position. The V-shaped groove 20 and land 26 are sized so that in the closed and latched position, the optical fiber buffer or plastic jacket 29 is pressed into V-shaped groove 20 and held firmly by the edge surface 30 of land 26. The sides of land 26 are inclined at an included angle of not more than that of V-shaped groove 20 or preferably less so as not to press into the sides of V-shaped groove 20. For the purposes of this embodiment, the included angle on the sides of land 26 may be about 50°. Referring still to FIG. 4, the outer portion 24 of buffer lock 14 comprises a latching surface 31 wich snaps over an appropriate ledge 32 on body 10 and, in cooperation with hinge 15, applies and maintains a firm grip on buffer 29 between land surface 30 and the side walls of the V-shaped groove 20.

Figure 3:
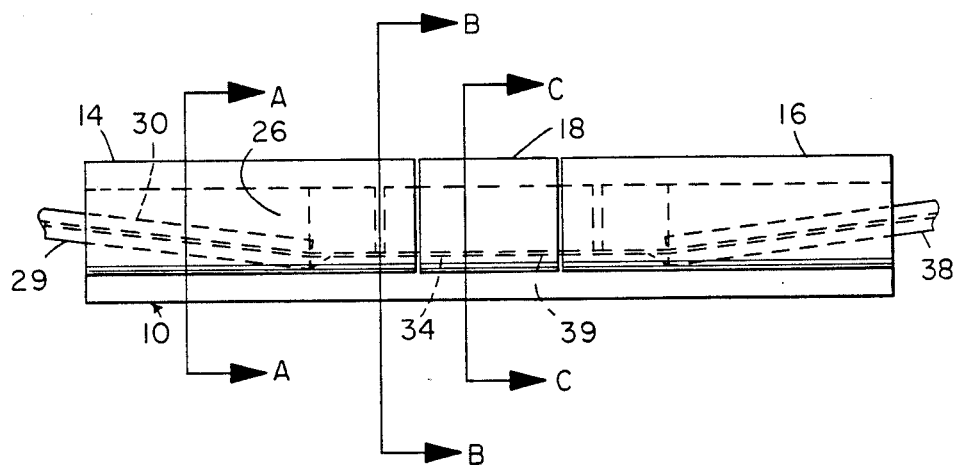
FIG. 3 is a side view of the connector of FIG. 1 illustrating a completed splice in accordance with the invention with the spliced optical fibers shown in phanthom.

Referring now to FIG. 3 and buffer lock 14, it will be understood that the edge surface 30 of land 26, shown in phantom, is inclined at a suitable angle such that it contacts buffer 29 along surface 26 and maintains an approximately uniform grip along that portion of buffer 29 residing in body 10. Optical fiber 34, from which the buffer 29 has been removed at the end, extends to about the middle of the center area of body 10. Similarly, an optical fiber 39 with buffer 38 is held by buffer lock 16. The end of optical fiber 39 from which the buffer 38 has been removed extends into the center section of body 10 such that the prepared ends of fiber 34 and fiber 39 are in close proximity. Both fiber ends are held by fiber lock 18.

Referring again to FIG. 1, as buffer lock 14 is closed over body 10, land 27 moves into V-shaped groove 21 and crossvane 28 moves into cross slot 33. Cross vane 28 is oriented perpendicular to the axis of land 27 and slot 33 is oriented perpendicular to the longitudinal axis of V-shaped groove 21. In addition, the crosswise edge of vane 28 is coplanar with the edge of land 27. The purpose and action of vane 28 in practicing this invention will be readily understood from the following description with reference to FIG. 5.

Figure 5:
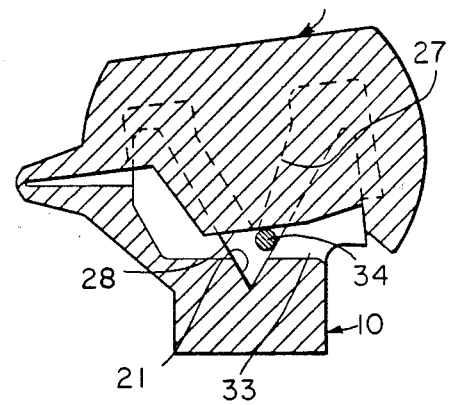
FIG. 5 is a sectional view taken along a line B—B of FIG. 3 illustrating the connector at a partially closed stage with an assumed misaligned optic fiber in contact with the crosswise vane forcing proper fiber alignment.

FIG. 5 illustrates a cross section taken along a line B—B of FIG. 3 through vane 28 and slot 33 and shows an assumed misaligned optical fiber 34 in V-shaped groove 21. As buffer lock 14 is closed, vane 28 urges optical fiber 34 toward the convergence of the sides of V-shaped groove 21 and prevents the fiber 34 from being trapped between the side of land 27 and the side of V-shaped groove 21.

Figure 6:
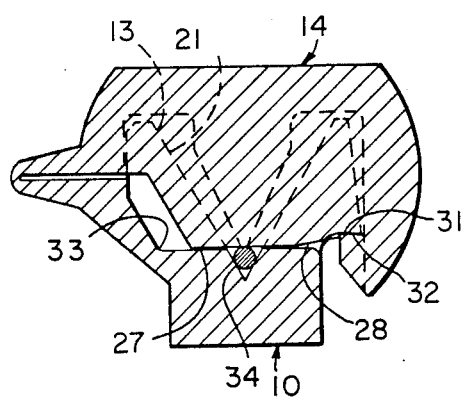
FIG. 6 is also a sectional view taken along a line B—B of FIG. 3 illustrating the connector at a stage subsequent to that of FIG. 5 in the closed and latched position with the optical fiber properly located.

The final phase of the splicing technique of the present invention is illustrated and further described with reference to FIG. 6. As buffer lock 14 is fully closed, latch surface 31 snaps over ledge 32 holding buffer lock 14 in the closed and latched position. In achieving this position, optical fiber 34 has been urged into the confluence of the side walls of V-shaped groove 21 by vane 28 and positioned fiber 34 under the edge of land 28 where it is held firmly by the full length of land 27 in V-shaped groove 21 and part of V-shaped groove 13 which is coplanar with V-shaped groove 21. Cross slot 33 is sufficiently wide and deep so as to provide no interference with vane 28 although at the same time slot 33 is shallower than V-shaped groove 21 by an amount sufficient to support the optical fiber. The difference in depth between slot 33 and V-shaped groove 21 is appropriately about the diameter of the optical fibers being spliced.

Figure 7:
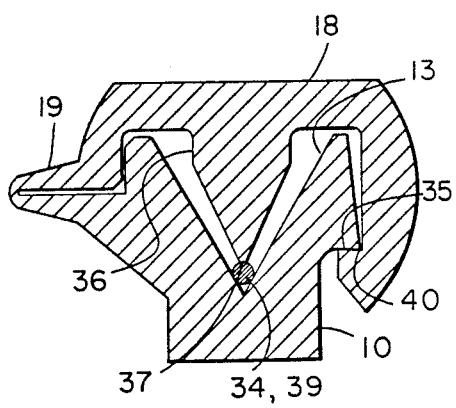
FIG. 7 is a sectional view taken along a line at C—C of FIG. 3 in the central portion of the connector illustrating the optical fibers being held in precise axial alignment in the closed and latched position.

Referring again to FIG. 1, fiber lock 18 includes a latch 35, a land 36 having an edge surface 37 and is a hinged to body 10 by hinge 19. Edge surface 37 is coplanar with edge surface 27 of buffer lock 14 and the corresponding edge surface of buffer lock 16. When fiber lock 18 is closed bending hinge 19, as shown in FIG. 7, land 36 enters V-shaped groove 13 and edge surface 37 of and 36 contacts optical fibers 34 and 39. As fiber lock 18 is fully closed, latch 35 snaps over ledge 40 urging optical fibers 34 and 39 into axial alignment.

Figure 8:
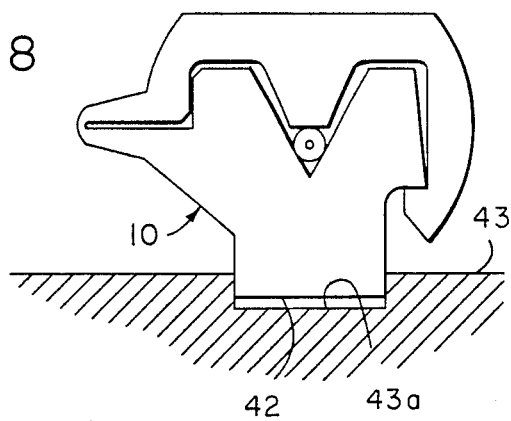
FIG. 8 is an end view of the connector in the closed position showing it held firmly in a fixture which permits both hands of the operator to be free for the splicing operation.

Prior to starting assembly, the operator may place the molded splice 10 into an assembly fixture 43, as shown in FIG. 8, which would hold the connector or splice 10 firmly while permitting the operator to use both hands for assembly work. One method for accomplishing this is simply to mold a projection 42 into body 10 which would fit snugly into a groove 43a in the fixture.

Figure 9:
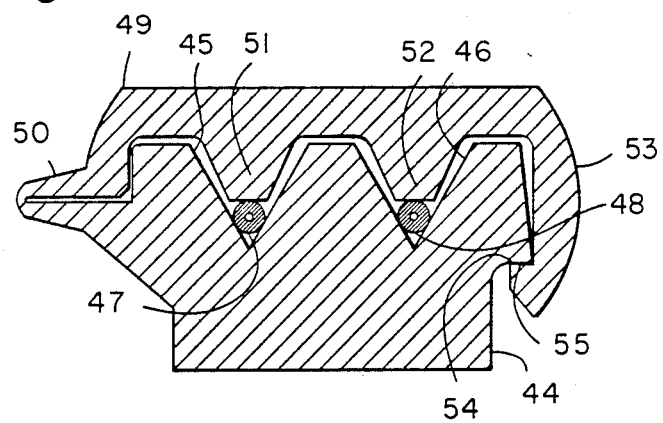
FIG. 9 is a sectional view of a double splice connector taken at a location equivalent to the line A—A of FIG. 3 and illustrating the connector in the closed and latched position gripping the buffers of two optical fibers.

FIG. 9 illustrates the cross section of a multiple fiber splice, in this case two, in which body 44 comprises chambers with V-shaped groove configurations 45 and 46 for two optical fibers with buffers 47 and 48. A buffer lock 49 is connected to body 44 by hinge 50 and comprises two lands 51 and 52 which in the closed and latched position grip buffers 47 and 48 respectively securely holding them in their correct positions. The outer portion 53 of buffer lock 49 comprises a latching surface 54 which snaps over an appropriate ledge 55 on body 44 and in cooperation with hinge 50 applies and maintains a firm grip on fiber buffers 47 and 48. Other portions of the dual splice are functionally similar to the single splice but duplicated as appropriate so that two splices are made.

Figure 10A:
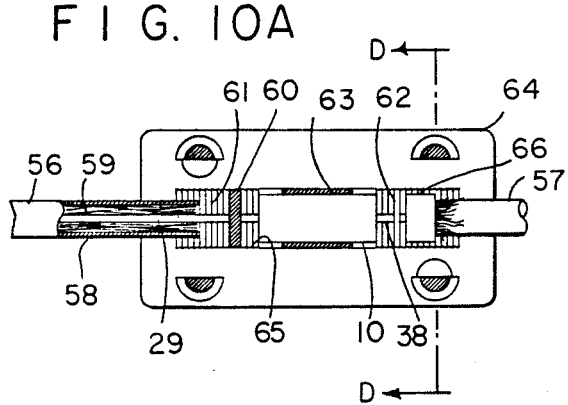
FIG. 10A illustrates a strain relief device applied over the connector of the present invention for relieving cable tension and protecting the connector splice from mechanical damage as well as tension induced failure.
Figure 10B:
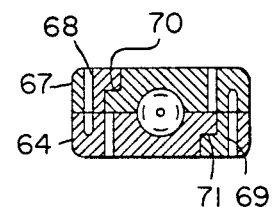
FIG. 10B is a section view of the strain relief of FIG. 10A taken along line D—D.

FIGS. 10A and 10B illustrate a tension or strain relief installed over the splice assembly of FIG. 3. FIG. 10A shows the splice 10 installed in one half of the tension relief with the other half removed. Splice body 10 joins the optical fiber of cable 56 with that of cable 57. The end of cable 56 is prepared by shortening jacket 58 leaving buffer 29 and its fiber projecting and also tension support fibers 59. A flanged ferrule 60 is inserted over buffer 29 and under tension support fibers 59 which in turn are wrapped back outside of jacket 58 and pulled snug. Sleeve 61 is slipped over fibers 59 and crimped firmly, thus locking fibers 59 and jacket 58 to flanged ferrule 60.

Cable 57 is similarly prepared with its fibers and jacket locked to a flanged ferrule 62. Before installing the tension relief, soft material 63 is either wrapped around splice body 10 or placed into relief member 64 to cushion the splice and protect it from mechanical shock or vibration, either of which might break the brittle optic fiber. Tension member 64 is then placed around the splice and cable ends such that the beveled edges of flanged ferrules 60 and 62 fit into one of a series of grooves 65 and 66 respectively in tension member 64 such that buffers 29 and 38 are limp and free of tension. A series of grooves is provided so that the finished length between flanges 60 and 62 is not critical and a reasonable variation, ¼ inch (6.4 mm) more or less, can be accommodated. At this time, the other tension relief member 67 (FIG. 10B) can be placed over the top and tightly assembled to member 64. After assembly, any tension between cables 56 and 57 will be borne by the tension relief members 64 and 67, thus protecting splice 10.

FIG. 10B is a cross section taken along line D—D of FIG. 10A and shows one form of attachment for parts 64 and 67 which include flexible fingers 68 and 69 which snap over ledges 70 and 71 respectively. Other forms of attachment might also be used such as screws with threaded holes or nuts or self-tapping screws with appropriate lead holes.

Figure 2:
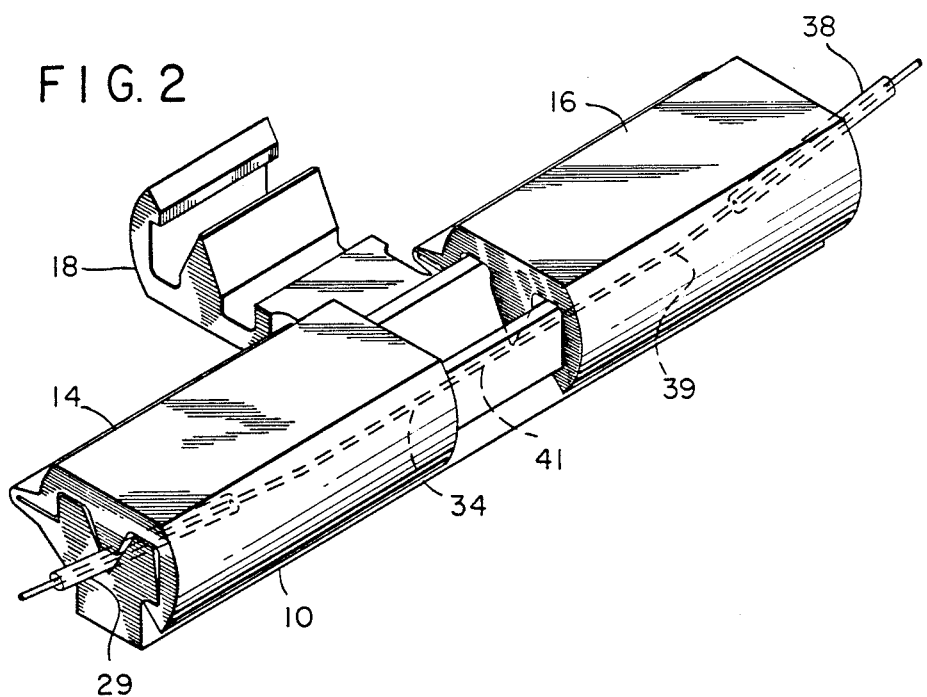
FIG. 2 is a perspective view of the connector of FIG. 1 illustrating one stage of the splicing technique in accordance with the invention wherein two optical fibers are locked in place by the outer top segments of the connectors and the center top segment is open.

The simple operation of practicing this invention may now be easily understood with the following description and reference to FIGS. 2 and 8. The operator prepares the ends of the two fibers to be spliced by techniques well known in the art so that after end preparation, approximately 1 inch (25.4 mm) of fiber extends beyond the end of the jacket. Of this length, approximately ⅜" (9.5 mm) is stripped of the plastic jacket or buffer leaving about ⅝" (15.9 mm) covered with the buffer.

Referring first to FIG. 8, the operator may place the splice into the assembly fixture. Then, referring to FIG. 2, the operator places one fiber 34 with its buffer 29 into one side of body 10 so that the end of the fiber 41 is approximately in the center of body 10. Buffer lock 14 is then closed and latched. The operator then places the second fiber 39 with buffer 38 into the other side of the splice so that the end of fiber 39 is butted against fiber end 41. Buffer lock 16 is then closed and latched. The operator then examines the ends of the fibers with an appropriate magnifier. If the ends of the fibers were not properly butted, the operator could open one buffer lock and adjust the relationship of the two fibers and again close and latch the buffer lock. At this stage, fiber lock 18 is closed and latched or, if desired, an index matching fluid or index matching cement, commonly used materials in the art, could readily be added before closing and latching the fiber lock 18. At this point, the splice is complete.

If the splice were going to be assembled with a strain relief as in FIG. 10, the operator would leave approximately 1 inch (25.4 mm) of tension support fiber extending beyond the end of the jacket and would install the flanged ferrule 60 and sleeve 61 before splicing to a similarly prepared cable.

While the invention has been described with reference to specific embodiments, it should be understood that various modifications thereto might be made without departing from the spirit and scope of the following claims.

1. A fiber optical connector for splicing at least one pair of optical fibers end-to-end comprising:
    a latchable housing having one bottom section and three top sections, each top section connected to the bottom section by a flexible hinge and adapted to close and latch with the bottom section independent of the other two top sections; and a plurality of V-shaped grooves disposed axially along three continuously adjacent segments of said bottom section and forming a single, continuous V-groove extending axially from one end of the bottom section to the other end, one segment located at said one end of the bottom section and adapted to receive and latch with a first of the three top sections, a second segment located at the other end and adapted to receive and latch with a second top section, and a central segment adapted to receive and latch with a third, central top section.

2. A connector according to claim 1, further comprising:

a first and second land sections disposed on said first top section, said first and second land sections adapted to grip a first optical fiber inserted into said first bottom segment when the first top section is closed;

a third and fourth land section disposed on said second top sections, said third and fourth land sections adapted to grip a second optical fiber inserted into said second bottom segment wherein the second top section is closed; and a fifth land section disposed on said third central top section, said fifth land section adapted to grip and align the ends of both fibers.

3. A connector according to claim 2, further comprising a first and second V-shaped groove disposed axially in said first bottom segment, said first groove being disposed at one end of the bottom section and being inclined relative to said second groove;

a third and fourth V-shaped groove disposed axially in said second bottom segment, said third groove being disposed at the other end of the bottom section and being inclined relative to said fourth groove; and a fifth V-shaped groove disposed in the central segment, said fifth V-shaped groove being adjacent but separated by a slot from said second V-shaped groove of the first segment and said fourth V-shaped groove of the second segment.

4. A connector according to claim 3 wherein the second and fourth land sections each further include a cross vane oriented perpendicular to each respective land section, each cross vane adapted to be received by the slots separating the second and fourth V-shaped grooves respectively from said fifth V-shaped groove.

5. A connector according to claim 3, wherein the first and third land sections have top surfaces which are inclined to urge the first and second optical fibers downward into the first and third V-shaped grooves when the first and second top sections are closed.

6. A connector according to claim 3 wherein the inclined angle between the first and second V-shaped grooves and between the third and fourth V-shaped grooves is less than 180 degrees.

7. A connector according to claim 2 wherein the first and second optical fibers each include an optical fiber core surrounded by an insulating jacket except at the ends of each optical fiber where the jacket has been removed to expose the fiber core; and wherein said first and third land sections are adapted to grip respectively the insulating jacket of said first and second optical fibers, said second and fourth land sections are adapted to grip respectively the exposed fiber core of said first and second optical fibers, and said fifth land section is adapted to grip simultaneously the ends of the exposed fiber cores of both said first and second optical fibers.

8. A connector according to claim 1 where each of the three top sections has a latching surface adapted to snap over on a ledge along the bottom surface.

9. A connector according to claim 1 wherein the bottom section has a longitudinal projection adapted to be received and held in a fixture assembly.

10. A connector according to claim 1 further including a strain relief comprising a first and second member, a first ferrule secured to a first optical fiber cable which includes said first optical fiber, a second ferrule secured to a second optical fiber cable which includes said second optical fiber, a plurality of recesses in said first relief member adapted to receive said first and second ferrules, and latching means for joining said first and second relief members, so that the connector is surrounded by the strain relief.

* * * * *